T. ISHERWOOD & W. NUTTALL.

Weft-Stop Mechanisms for Looms.

No. 6,010. Reissued Aug. 11, 1874.

WITNESSES:

A Bennewitz v. Hof.

C. Salgnick

INVENTOR:

T. Isherwood

BY W. Nuttall

ATTORNEYS.

THE GRAPHIC CO. PHOTO-LITH. 39 & 41 PARK PLACE, N.Y.

UNITED STATES PATENT OFFICE.

THOMAS ISHERWOOD AND WILLIAM NUTTALL, OF WESTERLY, RHODE ISLAND, ASSIGNORS, BY MESNE ASSIGNMENTS, TO THE NATIONAL WOOLEN LOOM-STOP-MOTION COMPANY, OF SAME PLACE.

IMPROVEMENT IN WEFT-STOP MECHANISMS FOR LOOMS.

Specification forming part of Letters Patent No. 138,893, dated May 13, 1873; reissue No. 6,010, dated August 11, 1874; application filed March 21, 1874.

*To all whom it may concern:*

Be it known that we, THOMAS ISHERWOOD and WILLIAM NUTTALL, of Westerly, in the county of Washington and State of Rhode Island, have invented a new and Improved Weft-Stop Motion, of which the following is a specification:

Our invention consists of a comb of one or more wires, and devices for presenting them, after the shuttle passes behind the weft-thread and in advance of the reed, to comb the weft or filling toward the weft-fork used for throwing off the shipper-lever, and thereby insure the raising of it properly when the weft is present, the said comb and the stopping mechanism being located near the middle of the loom, or thereabout. It also consists of a novel arrangement of means for presenting the weft-fork or feeler to the weft in a suitable position in advance of the cloth, and then moving it away, so as not to interfere with the beating up of the weft by the reed.

The arrangement of the stopping mechanism at the middle of the lay saves the necessity of employing one near each edge of the warp, and it is better, because, in the latter arrangement, an end of broken weft extending to the middle of the warps, or beyond, will often raise the latch of the weft-fork and prevent the stopping of the loom.

It often happens in looms carrying several shuttles that, owing to the cutting or over-straining of the weft in particular places by the shuttle-boxes, it breaks, so that the ends are long enough to raise the latches when the stop-motion is at the side of the loom, and thus the loom is not stopped as soon as it should be. Hence, the arrangement of the stop-motion at the middle of the loom is particularly desirable.

Figure 3:
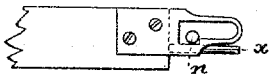
Figure 1:
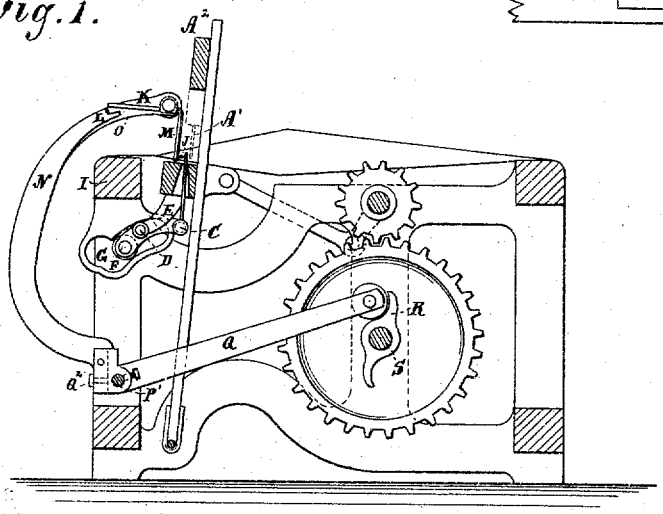
Figure 2:
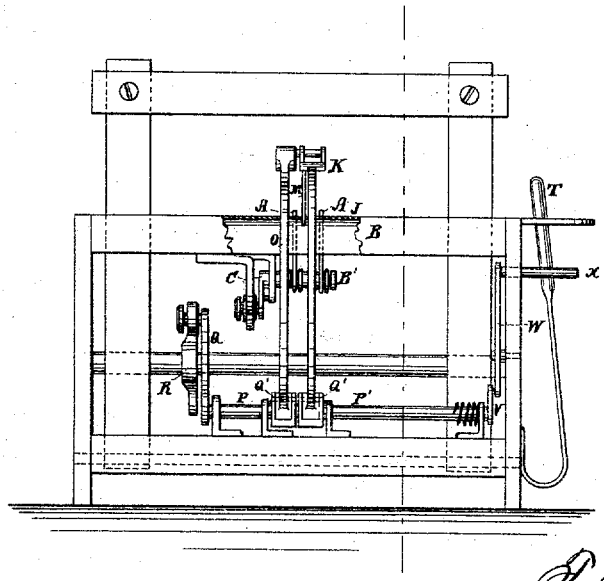

Figure 1 is a sectional elevation of a loom provided with our improved weft-stop motion. Fig. 2 is a front elevation with a part of the front beam broken out. Fig. 3 shows the catch of the belt-shipper lever.

Similar letters of reference indicate corresponding parts.

A A represent two wires or comb projecting upward through the beam B of the lathe from the free end of a rock-lever, C, pivoted at D on a bracket, E, projecting downward and forward from the lathe-beam, and carrying at its other end a friction-roller, F, which works in a cam-slot, G, of a plate, H, attached to the under side of the front beam I of the loom, the slot being so constructed that, as the lathe swings forward, the wires will be thrown up behind the weft J as soon as the shuttle has passed, and remain to carry forward and support the weft until it has held the latch K up by acting on the feeler M a sufficient length of time to pass the notch L of the lever N. The latch and the feeler are pivoted on the end of the rock-lever O on the shaft P, which has a long arm or crank, Q, operated by the cam R on the main shaft S, which is so shaped that the feeler is carried back between the warps in front of the lay immediately after the shuttle passes, and sufficiently far to be struck by the weft and pressed back by it until the latch has passed the notch L, but withdraws it in time to be out of the way of the reed at the beat up. When the weft is broken the latch falls into the notch L, so that cam R throws lever N back by means of arm Q and rock-lever O, and lever N throws the shipper-lever T out of notch *n* by the arm V on the end of shaft P′, rock-lever W, and the pin *x*.

It is immaterial whether the wires A be arranged under the lathe-beam, together with their actuating devices, or above, for they can be arranged above it as well, as shown in dotted lines $A^1$, the rock-lever being arranged on the upper part of the lathe—say, the beam $A^2$—and the cam-plate H mounted on any suitable standard rising up from the loom-frame. By preference it and the rock-lever C would be arranged at one side of the loom, while the rod B′, projecting from the free end of the rock-lever, would extend along the lathe to the middle, or thereabout.

In practice we propose to have the levers N and O so attached to the shafts P and P′, or blocks $Q^1$ thereon, that they can be readily removed by removing a pin, $Q^2$, to facilitate the removal of the cloth from the cloth-roll.

Having thus described our invention, we claim as new and desire to secure by Letters Patent—

1. The combination, with the lathe, of the wires A and mechanism, substantially as described, for presenting them behind the weft and withdrawing them in the manner set forth.

2. The wires A, reciprocating vertically, and operating, as set forth, to support and carry forward the filling-thread, in combination with the weft-fork and shipping mechanism, substantially as described.

3. The combination of the rock-lever O, arm Q, cam R, and feeler and latch with the lever N for operating the shipper-lever, all arranged to operate in the manner described.

THOMAS ISHERWOOD.

WILLIAM NUTTALL.

Witnesses:

E. R. COTTRELL,

FRANCIS SHEFFIELD.